US005560834A

United States Patent [19]
Gold

[11] Patent Number: 5,560,834
[45] Date of Patent: Oct. 1, 1996

[54] MACHINE FOR DEWATERING A SLURRY OF ULTRAFINE SOLIDS

[76] Inventor: Dennis D. Gold, 215 Big Oak Dr., Franklin, Pa. 16323

[21] Appl. No.: 417,976

[22] Filed: Apr. 6, 1995

[51] Int. Cl.$^6$ .................................................. B01D 33/46
[52] U.S. Cl. .......................... 210/783; 210/791; 210/386; 210/396; 210/400
[58] Field of Search ................................... 210/783, 791, 210/386, 396, 400, 408

[56] References Cited

U.S. PATENT DOCUMENTS

| | | | |
|---|---|---|---|
| 2,097,529 | 11/1937 | Nordell | 210/396 |
| 3,984,329 | 10/1976 | Wenzel et al. | 210/400 |
| 4,354,935 | 10/1982 | Austin et al. | 210/400 |
| 4,602,998 | 7/1986 | Goron | 210/396 |
| 4,609,467 | 9/1986 | Morales | 210/396 |
| 4,729,836 | 3/1988 | Ickinger et al. | 210/783 |
| 4,857,193 | 8/1989 | Clements et al. | 210/396 |
| 4,986,911 | 1/1991 | Goron et al. | 210/400 |
| 5,026,487 | 6/1991 | Abdulmassih | 210/791 |
| 5,059,322 | 10/1991 | Austin | 210/396 |

*Primary Examiner*—Christopher Upton
*Attorney, Agent, or Firm*—Vivian L. Steadman; Harry I. Leon

[57] ABSTRACT

A machine for conditioning a flocculated mixture formed by adding high molecular weight polymer to a slurry of ultrafine particles such as are found in mining silts, clays, sludges and the like. With this machine, such mixtures, which have already been partially dewatered, can then be substantially further dewatered. Reductions to between about 27% and 30% moisture content have been obtained. The machine includes a perforate endless conveyor belt onto which a continuous flow of the mixture is deposited and an array of stationary inverter plates and rollers in which pairs of rows of plates alternate with the rollers, both the plates and the rollers extending downwardly into the mixture as it is being moved on the belt. The rollers in the array squeeze water out of the mixture without disrupting bonds between the polymers and ultrafine particles and, in the process of applying pressure, contribute to the formation of new bonds. Rollers further downstream are set to apply increasingly higher pressures to the mixture, the pressures corresponding with the anticipated decreases in the moisture content of a particular mixture as it moves along the belt. Such adjustments, together with individually setting the orientations and heights, relative to the belt, of each row of plates, allow the plates and the rollers to interact so as to knead the mixture, enhancing its cohesiveness. Downstream of the array, the mixture is squeezed, one last time, between the belt and a high pressure roller, expelling additional water from the mixture.

4 Claims, 3 Drawing Sheets

MACHINE FOR DEWATERING A SLURRY OF ULTRAFINE SOLIDS

BACKGROUND OF THE INVENTION

1. Field of the Invention

This invention relates generally to machines for separating liquid-solid suspensions continuously supplied to a moving filter. Although this invention can be employed to dewater a wide variety of suspensions, it has been found to be especially useful in separating water from mixtures containing a high percentage of ultrafine particles.

2. Description of the Prior Art

As byproducts of sand and gravel operations, including those preparing aggregates for concrete work and for road construction, industry generates tremendous quantities of ultrafine particles, commonly referred to as fines, in the form of suspended silts and clays. Unfortunately, there is little market for such materials per se; and they can be mixed only in very limited quantities with the rest of a saleable product. Indeed, of the total amount of silts and clays generated annually, only about 5 to 10 percent is being sold. The bulk of the annual production of suspended silts and clays is simply discarded.

Already, the volume of fines generated each year is staggering. In a single year, a typical plant can extract 500,000 tons of limestone from an 1 acre deposit and simultaneously produce, on a dry weight basis, 120,000 tons of fines. Moreover, reserves that were formerly considered uneconomical to mine because of their high silt or clay content are being tapped, increasing the ratio of fines-to-product generated annually.

The problem of what to do with the fines is expected to become more intractable, as long as prior art technology is employed, not only in terms of total volume but also in terms of increased unit cost per ton of fines disposed. This unit disposal cost has risen as plants have become more efficient at extracting a higher percentage of coarse materials from the residuals containing the fines.

The trend, at least in larger plants, is to employ cyclone separators to remove, from suspended silts and clays, a high percentage of those particles which are too large to pass through a 200 mesh screen. Experience has shown that downstream of such a cyclone separator, a suspension tends to be more difficult to dewater than it otherwise would have been.

Difficulties in dewatering a suspension of fines, even if it has not been subjected to a cyclone separator, are encountered once the suspension to allowed to settle, whether on a filter medium or in a drying bed. Upon settling, the suspended particles closest to the filter media or, alternately, to the bottom of the drying bed, tend to compact together, forming a substantially impermeable layer of suspended particles. While this lowest layer has a relatively low liquid content, successive layers of suspended particles disposed upwardly thereof do not.

The problem of dewatering a suspension trapped above a compacted layer of suspended particles increases dramatically whenever this layer is formed from a relatively homogeneous suspension which has a high percentage of colloidal-size particles (the so-called "ultrafines"); in such a situation, bonding between the particles is inhibited, reducing their settleability.

Percolation of water through a drying bed containing a slurry of fines in which little coarse material is present can be so slow that a virtual permanent quicksand is created. Not only does this quicksand give rise to a serious hazard to human beings and wildlife but also extensive environmental degradation results. Even an average-size plant, producing silt in suspension at the rate of 15 tons (dry weight) per hour, for example, consumes 25 acres per year in "drying beds".

On the other hand, attempts to force liquid to move, under pressure, through a compacted layer of suspended particles juxtaposed against a filter medium, except in small batch-type operations utilizing a pressurized chamber, have been without appreciable success. In particular, when a higher rate of feed must be handled than can be accommodated with a filter press, operators typically rely on a belt press, that is, a dewatering system utilizing an endless perforate conveyor belt. Unfortunately, when pressure is applied to a mixture of suspended particles on such a belt, portions of the mixture usually flow to the sides of the belt.

The prior art has sought to enhance drainage of filtrate through perforate belts with the use of plows. Extending downwardly into the suspended mixture, most of these plows are stationary and have working faces that are disposed perpendicularly to the upper surface of the belt; any compacted layer of solids agglomerated thereon which is brought into contact with these faces is dislodged horizontally, exposing the filter surface. Exceptions are the rotary gang plows taught by Carmel in U.S. Pat. No. 3,891,549.

Using his plows in a method for dewatering inhomogeneous suspensions having a high initial liquid content and an abundance of coarse particles, Carmel specifies that the plows must be rotated to prevent the formation of clods. Alternating with Carmel's plows are rollers which also rotate. The latter rotate concurrently with the direction of movement of the perforate conveyor belt and have a circumferential speed exceeding its speed.

With their working faces disposed at an angle substantially less than 90 degrees to the belt surface, Carmel's plows not only penetrate the lower compacted layer of solids, ditching it and exposing the filter surface but also lift the compacted layer, turning the suspended mixture at least partially upside down. In the process, a layer of coarse particles of greater porosity than the compacted layer is brought into close proximity with the filter medium, facilitating drainage of liquid formerly trapped above the compacted layer. Downstream of the plows, the rollers squeeze more liquid out of this layer of coarse particles and mix them together with the finer particles.

Unfortunately, the dewatering of slurries with a high percentage of ultrafines is complicated by the need to use chemicals such as polymers to promote settling through the formation of aggregates of particles. Without aggregate formation, 80–90 percent of the suspended solids present in such a slurry would pass through a 325 mesh screen, i.e., they are as fine as grains of flour.

Both the rotary plows and rollers of Carmel's combination and the perpendicularly-disposed working faces of the stationary plows tend to rupture bonds between polymers and suspended solids. Missing from the prior art are any methods and devices for promoting aggregate formation by particle bonding within suspensions even as they are being dewatered on a moving conveyor belt.

SUMMARY OF THE INVENTION

The object of the present invention is to provide an improved method and apparatus which can be utilized to condition a flocculated mixture in which a high percentage of ultrafine particles are present so that the mixture, when discharged to an open pile on a sufficient slope, will substantially retain its shape and dewater further naturally, thereby facilitating eventual transport of the mixture to its point of ultimate disposal.

A further object of the present invention is to provide such an apparatus having a perforate endless conveyor belt onto which a continuous flow of the flocculated mixture can be fed, the apparatus having a tonnage capacity which is substantially higher than conventional presses having the same belt width.

A still further object of the present invention is to provide a method utilizing a perforate endless conveyor belt for dewatering a flocculated mixture, the method promoting formation of bonds between suspended solids within the mixture and polymers added thereto.

In accordance with the present invention, there is provided a machine for separating water from an aqueous suspension moving on a perforate endless conveyor belt. The machine includes at least two horizontally-disposed rollers, each roller being juxtaposed between two sets of stationary inverter plates, a plurality of such plates being arrayed in two rows in each set. The plates are spaced apart from each other in such a way that each plate in the first row in each set is paired with another plate in the second row in the same set. Working faces of the plates within each pair are directed generally upstream and toward the opposing outer edges of the belt. As the belt moves, it ultimately brings the entire suspension, across the width of the belt, into contact with one of these working faces. To promote lifting the lower compacted layer of the suspension and turning it in first one direction and then another, the working face of each plate, from its lowest edge, is curved upwardly and rearwardly along an imaginary arc. Each pair of plates in the first and second rows comprises means for successively curling the suspension upwardly from two opposing directions. As the suspension encounters the pair of plates, it is folded upon itself twice in a partially overlapping fashion, thereby promoting bonding between polymers and ultrafine particles as folds are being created within the suspension. Downstream of each set of inverter plates, except the set disposed furthest downstream, a roller is employed to press the folds together, in a controlled manner, kneading the suspension much as bread dough is kneaded.

BRIEF DESCRIPTION OF THE DRAWINGS

Further details are explained below with the help of the examples illustrated in the attached drawings in which.

DETAILED DESCRIPTION OF THE PREFERRED EMBODIMENT

Figure 1:
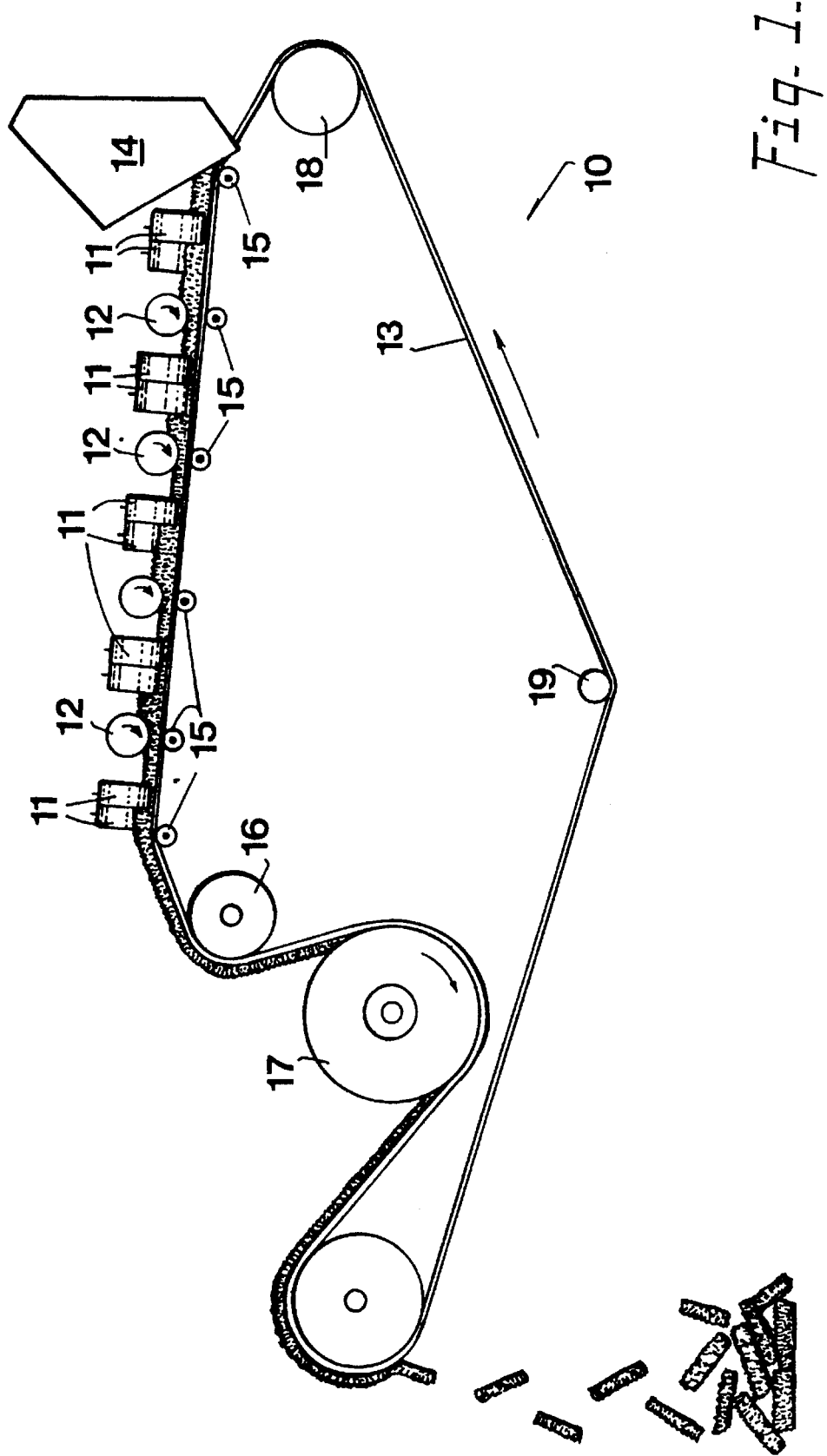
FIG. 1 shows, in a somewhat simplified elevational view, a machine for carrying out the method according to the present invention.

In accordance with the invention, an improved belt press, indicated generally by the reference numeral 10, has horizontally-disposed rollers 12 juxtaposed between sets of stationary inverter plates 11. The belt press 10 can be utilized to dewater flocs of colloidal suspensions to much lower levels of moisture content than are achieved with belt presses of the prior art.

In preparation for dewatering a suspension on the press 10, chemical coagulants and flocculants are added, in succession, to the suspension in a mixing chamber (not shown). Subsequently, the suspension, with its chemical additives, is fed into a flocculation zone (not shown) where aggregates of colloids and of polymers begin to form and settle out of solution. Downstream of the flocculation zone, the settled flocs are partially dewatered. Only after these various preparatory steps have been accomplished are the flocs then fed, as a suspension, onto the belt press 10. There the flocs are subjected to further dewatering using the press 10 to promote a phenomenon known as particle bonding whereby even larger aggregates of floc particles can be created.

For suspensions which are to be subjected to a final dewatering step using the belt press 10, one combination of chemical additives which has been found suitable for promoting coagulation and flocculation of such suspensions is a blend of aluminum sulfate with an anionic polymer, such as AD-605 available commercially from DBG Enterprises, Inc., located in Franklin, Pa. Both the coagulant and the flocculant must be carefully matched. Indeed, the required dosage of polymers may be strongly dependent upon the coagulant chosen. Further, minimization of chemical consumption requires matching attributes of at least one of 40 or more anionic polymers with certain properties of the coagulated colloidal suspension, including its zeta potential, pH, temperature, viscosity, and the concentration, size distribution, and average molecular weight of particles suspended therein. In general, not only does the required polymer dosage rate vary with these properties but also it is critically dependent upon the point(s) and rate at which the polymer is added to the suspension.

The machine 10 can be utilized with a wide range of colloidal suspensions limited only in that the suspensions not contain an abundance of coarse materials. When an excess of coarse materials is present, the suspension develops cracks as it is being dewatered because of differences in bonding characteristics between large particles and ultrafines. This cracking prevents the suspension from forming a mass of uniform consistency; and as a consequence, the suspension tends to build up in front of the stationary inverter plates 11, interfering with the dewatering process.

Among the suspensions for which a substantial increase in water removal can be obtained over that achievable with conventional belt presses are mining silts, clays and sludges produced by either industrial or municipal wastewater treatment processes. With the press 10, suspensions that contain a high percentage of ultrafines have been routinely dewatered well beyond levels achievable with prior art technology. These suspensions include slurries in which, prior to treatment, 90 percent of the suspended particles therein could be passed through a 325 mesh screen. After undergoing preliminary treatment to reduce their moisture content from about 70 percent to between about 40 and 55 percent, such slurries have been further dewatered, using the press 10, to between about 27 and 30 percent moisture content.

Moreover, in a typical application, these levels of water removal can be achieved using the press 10 when substantially higher tonnages of suspended material are processed than can be achieved using prior art technology. Specifically, for a belt width of 100 inches and belt speed of 10–24 feet per minute, the press 10 can dewater a slurry of mostly ultrafines fed into the mixing chamber (not shown) at a rate of about 150 to 300 gpm and discharge cake from this dewatering process at the rate of 20 to 30 tons (dry weight) per hour. Alternately, when greater reduction in the moisture content of the cake is desired, the belt 13 can be run at a slower rate, but at best, the moisture content can be reduced to only about 20 percent moisture content. To achieve this lowest moisture content, the belt 13 has to be run at only about 20 to 30 percent of its rated speed, reducing the cake discharge rate correspondingly.

Earlier technology, on the other hand, when using a belt press of the same belt width and running it at the same belt speed as the press 10, can only dewater slurry of the same composition at a cake discharge rate of 15 tons (dry weight) per hour; moreover, the cake so produced has a substantially higher moisture content (about 40 to 50 percent).

As is best seen in FIG. 1 the belt press 10 includes an array of stationary inverter plates 11 and of horizontally-disposed rollers 12, each roller being disposed between two sets of inverter plates. Both the plates 11 and the rollers 12 are suspended above a perforate belt 13 such as a polyester screen of varying screen weaves which runs endlessly over pulleys 15, 16. In use, the inverter plates 11 and rollers 12 extend downwardly into the mixture as it is being moved on the belt 13. The rollers 12 rotate at the same speed as does the belt 13 and concurrently therewith in the direction indicated by the arrows, so that shear forces applied by the rollers to the suspension are minimized. Moreover, the surfaces of the rollers 12 which contact the suspension are smooth, thereby reducing any tendency of the suspension to stick to the rollers. Whatever suspension does so adhere can be removed with the use of scrapers (not shown).

The mesh of the screen utilized in the belt 13 is preferably selected, on the basis of experimental trials, so as to accommodate whatever liquid-solid mixture is to be dewatered; for dewatering a suspension of mostly flocculated ultrafine particles, a belt 13 having a filter cloth which is rated 600 cubic feet per minute, generally more "open" than filter cloth used in the prior art, has been found to perform satisfactorily.

In the preferred embodiment illustrated in FIG. 1, the belt press 10 further includes a tension roller 18 and means for controlling the position of the roller 18 so that tension on the belt 13 can be adjusted. Also, to stabilize the belt 13 so that it can move back and forth at most only about 6 inches laterally, a steering roller 19, preferably adjustable with the use of a pneumatically-controlled mechanism (not shown), is provided.

As is also shown in FIG. 1, a chute 14 is provided for supplying and distributing liquid-solid mixtures to the belt 13. When the liquid-solid mixture being fed onto the belt is an aqueous suspension of ultrafine particles to which chemicals/polymers have been added to promote flocculation and which has already been partially dewatered, the depth of the suspension on the belt 13 immediately downstream of the chute 14 is preferably about 1½ inches.

Figure 2:
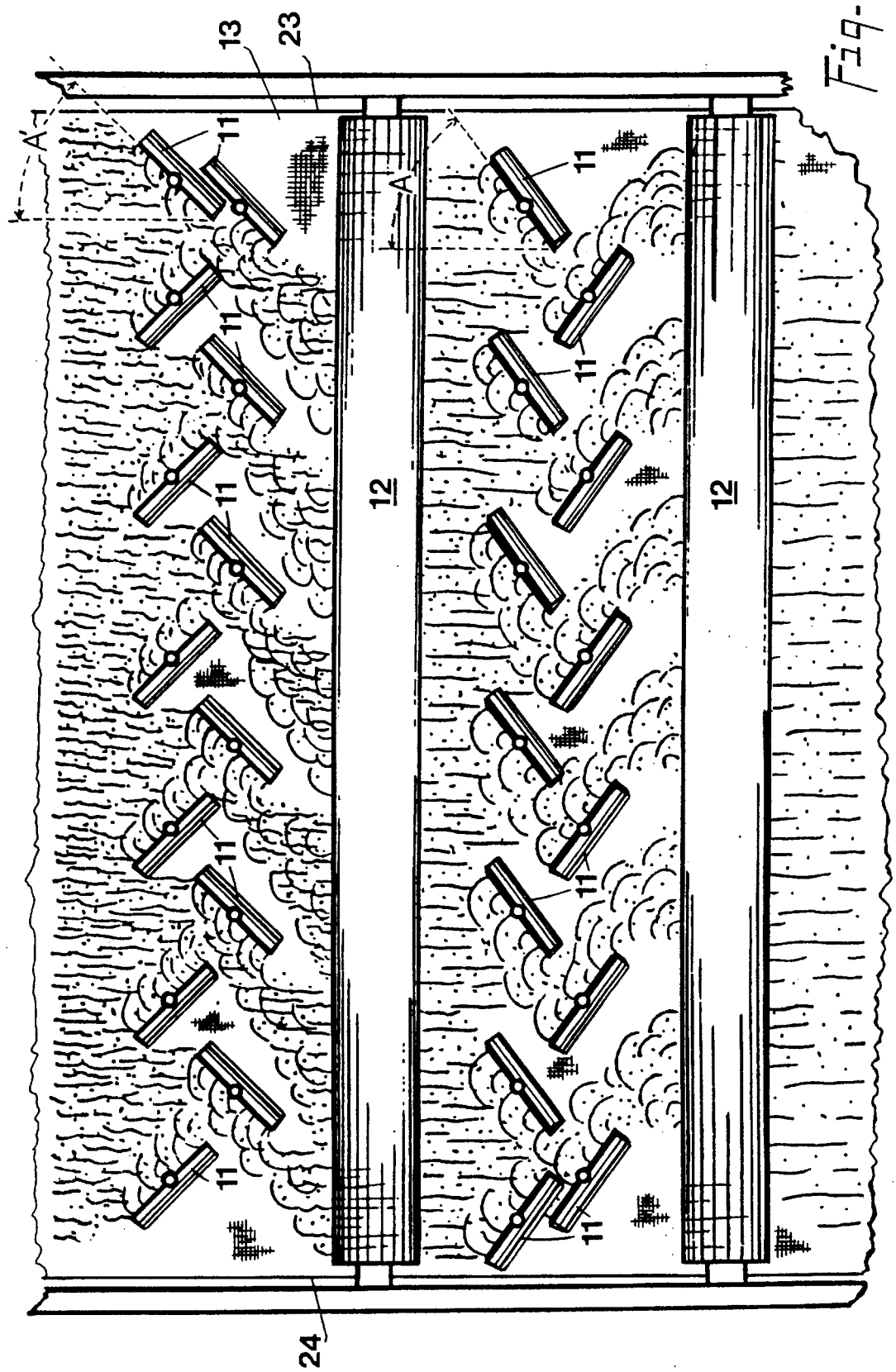
FIG. 2 is a plan view, on an enlarged scale, of a portion of the machine according to FIG. 1.

Within each of the two sets of stationary inverter plates 11 disposed on either side of each roller 12, the plates are arrayed, spaced apart from each other, in two rows (FIGS. 1 and 2). In the preferred embodiment, one of these rows has an odd number of plates 11; the other an even number of plates (FIG. 2). Each plate 11 in the latter row is paired with another plate in the other row in the same set. Projections of the plates 11 in the two rows, taken together, span the belt 13 transversely. That is, as the belt 13 moves, it brings suspension, across the entire width of the belt, into contact with one of the plates 11.

Figure 4:
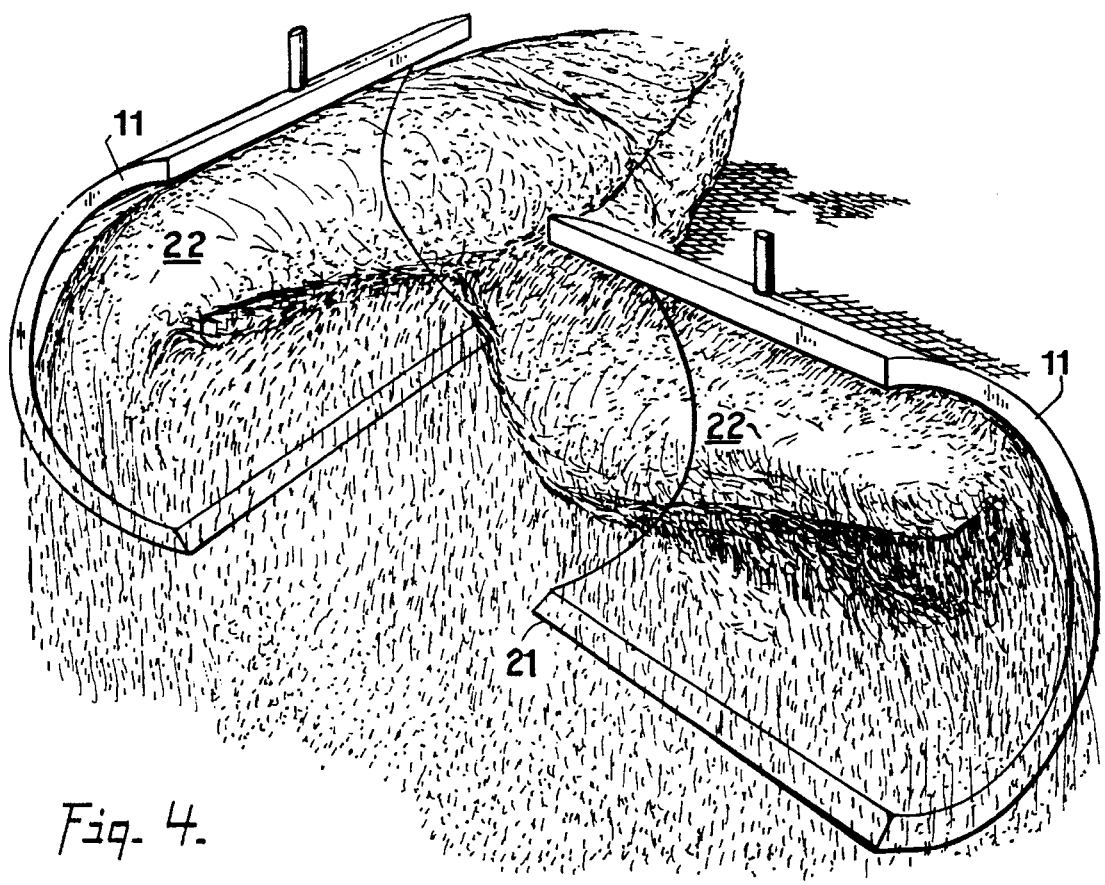
FIG. 4 is a transverse cross-section of a portion of the machine of FIG. 1, including a pair of inverter plates, the plates being shown when the machine is being used to dewater suspended material, which is illustrated by dashed lines superimposed on the machine.

The inverter plates 11 within each pair have working faces 22 which are directed generally upstream and toward the opposing outer edges 23, 24 of the belt 13 (FIGS. 2 and 4). Moreover, the orientation of the working face 22 of each plate 11 relative to an imaginary longitudinal centerline of the belt 13 is fully adjustable.

Generally, the working face 22 is directed more perpendicularly to the centerline for those plates 11 which are disposed in closest proximity to the chute 14; otherwise, testing has shown that, for some suspensions, material tends to bunch up in front of the plate 11 and only the belt 13 moves. For those plates 11 located furthest downstream, on the other hand, the working face 22 is preferably directed more nearly parallel, enhancing the tendency of suspension with less moisture content to peel off as a sheet. That is, as illustrated in FIG. 2, angle A' is generally less than angle A. However, the latter orientation (with angle A) of the working face 22 has been used for plates 11 close to the chute 14 when the suspension, especially one with a higher-than-usual percentage of coarse materials, tends to roll over and slide past the plate 11.

Figure 3:
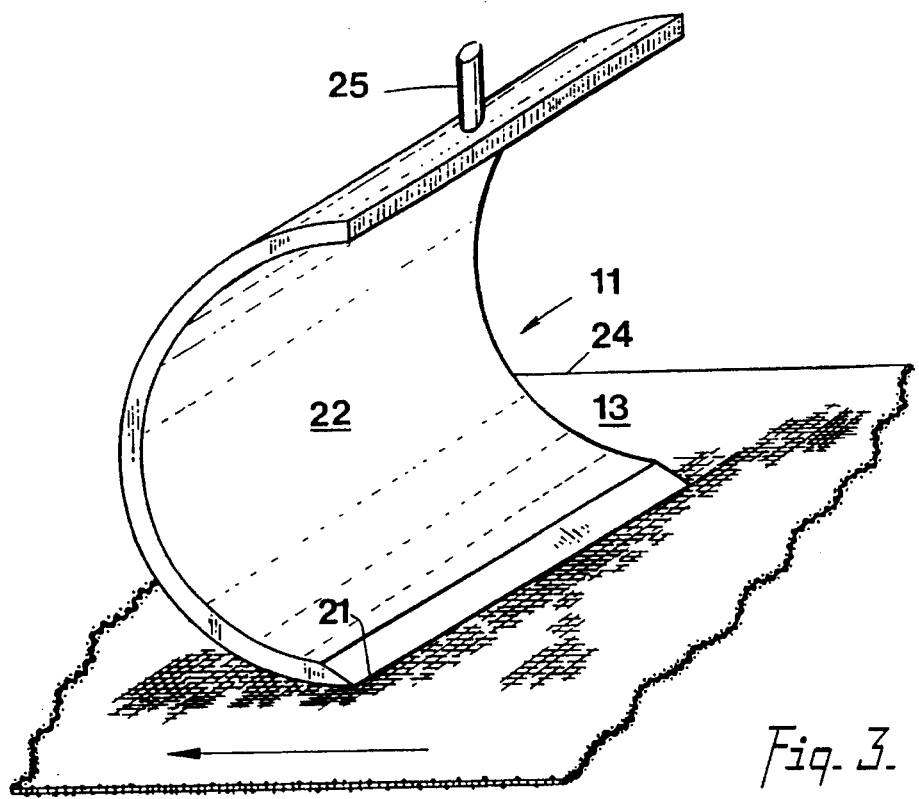
FIG. 3 is a perspective view, on a further enlarged scale, of the machine of FIG. 1, including one of the inverter plates, the plate being illustrated when the machine is free of suspended material to be dewatered.

Preferably, as illustrated in FIG. 3, the working face 22 of each inverter plate 11, from its leading edge 21, is also curved upwardly and rearwardly. Cross-sections of the face 22 disposed transversely to the lowest edge 21 have a radius of curvature which, by way of example, measures 1.75 inches, with the face 22 having a corresponding height and width of 4.25 inches and of 6.0 inches, respectively. As the suspension encounters each pair of plates 11 in the two rows, the suspension is curled upwardly in first one direction and then in a generally opposing direction. Consequently, as the suspension encounters each pair of plates 11, a portion thereof is folded upon itself first from one side of the portion and then from the other side thereof (FIG. 4).

The process of repeatedly folding the suspension upon itself promotes bonding between ultrafine particles within the suspension and polymers, especially those formerly wasted in forming bonds with the belt. Some of the latter polymers, once they have been destabilized as a result of the rupture of these useless bonds by the plow-type action of the plates 11, are brought, as portions of the suspension are lifted and folded in succession into a region where overlapping between the folds occurs, increasing the likelihood that these destabilized polymers will bond to ultrafines. As a result of these polymers reattaching themselves to particles within the suspension rather than to the wire screen of the belt 13, polymer consumption can be reduced.

Downstream of each set of inverter plates 11, except the set disposed furthest downstream, a roller 12 comprises means for pressing folds formed by the plates 11 together, in a controlled manner (FIG. 1). In the preferred embodiment, the distance between the pivotal center of each plate 11 and the axis of the proximate roller 12 measures, by way of example, about 7.75 inches; the roller itself has a diameter of about 3.5 inches.

Controlling the pressure applied by the rollers 12 requires means for adjusting the height at which each of the rollers is set above the belt 13. This height determines not only the amount of pressure which the individual roller applies to the suspension but also the depth of the suspension as it moves, with the belt, from beneath the roller. In general, the larger the total surface area of the particles making up the suspension, the greater care must be taken in adjusting the height of the rollers 12 so that the pressure they apply to the suspension increases only slightly from one roller to the next, thereby knitting suspended solids together rather than rupturing bonds already formed between them, especially those between particles and long-chain polymers added earlier to promote flocculation. Indeed, applying excessive pressure to the suspension can result in needless consumption of polymers.

In the preferred embodiment, each of the rollers 12 is set so that its bottom is about ¾ inch above the surface of the belt 13. As the suspension encounters each of these rollers 12 in turn, each further downstream roller applies greater pressure to the suspension as it becomes progressively drier. Field testing shows that setting each of the rollers 12 at ¾ inch above the belt 13 works well because when the slurry is stable enough to furrow higher than 2 to 3 inches in front of the roller, the slurry is stable enough to withstand the shear forces being applied. Moreover, if the slurry is not sufficiently stable to withstand the shear, then the slurry will not furrow up high enough in front of the rollers 12 to cause high shear.

Alternately, when the characteristics of the suspension allow greater pressure to be applied, the rollers 12 can be set in successively closer proximity to the belt 13. Then the furthest upstream roller 12 preferably clears the belt 13 by about 1 inch; and those rollers located further downstream have successively lower clearances, thereby reducing the thickness of the suspension until it exits from beneath the furthest downstream roller 12 at a thickness of only about ¾ inch. This ¾ inch solids cake thickness is still substantially greater than the ¼ inch thick cake commonly produced when suspensions are dewatered on prior art belt presses.

As illustrated in FIG. 1, the belt press 10 preferably comprises four horizontally-disposed rollers 12, each juxtaposed between two sets of stationary inverter plates 11. Some reduction in the moisture content of the suspension occurs as it passes under each of the rollers 12. In general, by the time the suspension reaches the last set of inverter plates 11, the moisture content has been reduced about 15 percent, with generally equal amounts of water being removed by each of the rollers 12.

Downstream of the last set of inverter plates 11, the suspension is furrowed so that portions of the belt 13 are exposed. A high pressure drum 17, preferably running at a higher speed than the belt 13 and concurrently therewith, is then employed to express additional water from the suspension. The water so expressed exits primarily through the exposed portions of the belt 13. As it is compressed between the drum 17 itself and the single belt 13, the moisture content of the suspension is typically reduced by another 5 percent or so. In all, the total moisture content of the suspension is reduced by about 20 percent.

How effective the drum 17 is in removing additional water depends, in large part, on the performance of the inverter plates 11 and rollers 12 upstream of the drum; unless they have adequately enhanced bonding between polymers and ultrafines within the suspension, creating an adhesive mass of generally uniform consistency, the action of the drum can cause liquid from the suspension to squirt out from the sides of the belt rather than to filter through it.

Once a suspension has been dewatered by the belt press 10, solids which remain on the belt 13 are discharged to a pile. As the solids sit in the pile, additional water drains from beneath them; this drainage process is enhanced when the solids are of an uniform consistency throughout their mass. Moreover, removing this water is facilitated by having the pile located on a slope. Experience has shown that after the pile has been allowed to sit 2 or 3 days, the solids are sufficiently dry to be loaded into the open bed of a dump truck or the like and hauled therein without material seeping out beneath its tailgate.

What is claimed is:

1. A machine for separating liquid from a liquid-solid suspension moving on a perforate endless conveyor belt, the belt defining first and second outer edges and an imaginary centerline, comprising:

(a) first and second horizontally-disposed rollers, the rollers extending downwardly into the suspension as it is being moved on the belt;

(b) a plurality of inverter plates, each of the plates having a face with an elongated edge, the elongated edge being set generally parallel with and slightly above the conveyor belt, the elongated edge being disposed at an angle to the centerline of the belt, the plates being arrayed in first and second rows, the plates in the first row being spaced apart from each other and the plates in the second row being spaced apart from each other, the face of each of the plates in the first row being directed toward the first outer edge of the belt, each plate in the first row being paired with another plate in the second row and being disposed contiguous thereto, the face of each plate in the second row that is so paired being directed toward the second outer edge of the belt; each plate in the second row so paired being spaced apart from each of the plates in the first row both in a direction parallel to the longitudinal centerline and in a direction perpendicular thereto; each face being directed generally upstream; the first roller being disposed upstream of the first row of plates and the second roller being disposed downstream of the second row of plates; and (c) means including the belt for bringing the suspension into contact with the faces of the plates.

2. The machine according to claim 1 which further comprises means for curling the suspension, as a portion thereof successively encounters an individual pair of plates in the first and second rows, upwardly in first one direction and then in another direction before said portion of the suspension is pressed beneath the downstream roller, the curling means including the face of each plate, from the elongated edge thereof, being curved upwardly and rearwardly along an imaginary arc.

3. A machine for separating water from an aqueous suspension of colloidal-size particles and polymers moving on a perforate endless conveyor belt, comprising:

(a) at least one set of stationary inverter plates, each plate having a working face; the plates being arrayed in first and second rows in each set, the plates being spaced apart from each other; each plate in the first row in each set being paired with another plate in the second row in the set;

(b) means for curling the suspension, as a portion thereof successively encounters an individual pair of plates in the first and .second rows, upwardly from two opposing directions, folding said portion upon itself twice in a partially overlapping fashion, the curling means including working faces of the plates within each pair being directed generally upstream and toward opposing outer edges of the belt, the working face of each plate, from its lowest edge, being curved upwardly and rearwardly along an imaginary arc, thereby promoting bonding between polymers and ultrafine particles as folds are being created within the suspension; and (c) means disposed downstream of the set for pressing together, in a controlled manner, folds formed in the suspension by the curling means, thereby kneading the suspension.

4. A method for dewatering a suspension containing a flocculated mixture of polymers and ultrafine particles supplied to a moving filter, comprising:

(a) lifting a portion of the suspension from the filter;

(b) folding the portion of the suspension upon itself twice in a partially overlapping manner, thereby promoting bonding between polymers and ultrafine particles as folds are being created within the suspension; and (c) pressing the folds together so as to express water, through the filter, from the suspension.

* * * * *